United States Patent [19]

Takeuchi

[11] Patent Number: 4,621,536
[45] Date of Patent: Nov. 11, 1986

[54] ACTUATING MECHANISM FOR GEAR TRANSMISSIONS

[75] Inventor: Kenji Takeuchi, Aichi, Japan

[73] Assignee: Aisin Seiki Kabushiki Kaisha, Kariya, Japan

[21] Appl. No.: 675,753

[22] Filed: Nov. 28, 1984

[30] Foreign Application Priority Data

Dec. 16, 1983 [JP] Japan ................................ 58-238091

[51] Int. Cl.$^4$ ............................................. G05G 9/12
[52] U.S. Cl. .................................. 74/473 R; 74/360; 74/745
[58] Field of Search ...................... 74/360, 745, 473 R

[56] References Cited

U.S. PATENT DOCUMENTS

| | | | |
|---|---|---|---|
| 2,327,550 | 8/1943 | Peterson et al. | 74/473 R |
| 3,310,992 | 3/1967 | Stott | 74/473 R |
| 3,495,473 | 2/1970 | Willis | 74/473 R |
| 3,498,155 | 3/1970 | Ivanchich et al. | 74/745 |

*Primary Examiner*—Allan D. Herrmann
*Attorney, Agent, or Firm*—Burns, Doane, Swecker & Mathis

[57] ABSTRACT

A gear transmission mechanism includes main transmission gearing and auxiliary transmission gearing. Main transmission gearing transmits the movement of a shift lever in a shift direction through a shift mechanism and a fork head to a sleeve, and auxiliary transmission gearing can select a high or low speed ratio in response to transmission of the movement of the shift lever to another sleeve when the shift lever is shifted from a neutral position in one shift direction or the other. The shift mechanism comprises an input member, a reversing mechanism, a reversing member, and a pair of shift heads, the input member coacting with the shift lever such that the movement of the shift lever in the shift direction results in the movement of the input member in a shift direction. The reversing mechanism is interposed between the input member and the reversing member for reversing the movement of the input member in the shift direction into movement in an opposite shift direction and for transmitting the reversed movement to the reversing member.

7 Claims, 16 Drawing Figures

ACTUATING MECHANISM FOR GEAR TRANSMISSIONS

BACKGROUND OF THE INVENTION

1. Field of the invention:

The present invention relates to an actuating mechanism for a gear transmission for automobiles.

2. Description of the Prior Art:

Automobiles such as trucks have conventionally employed a gear transmission mechanism composed of main transmission gearing having multiple ratios and auxiliary transmission gearing having high and low speed ratios. Such gear transmission mechanism is advantageous in that the auxiliary transmission gearing enables the gear transmission mechanism to provide speed ratios twice those of the main transmission gearing, and the gear transmission mechanism is small and lightweight as a whole as compared with the speed ratios available.

Figure 1:
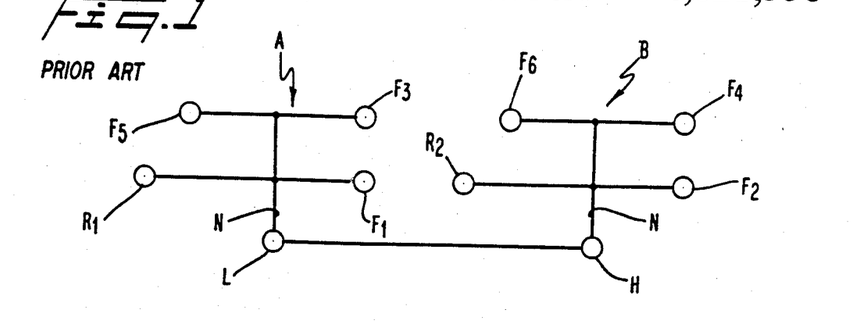
FIG. 1 is a diagram of a shift pattern for a shift lever in a conventional gear transmission mechanism having an auxiliary transmission gearing.

FIG. 1 of the accompanying drawings illustrates a conventional speed ratio pattern of such a gear transmission mechanism. Designated at L and H are speed-reduction and direct-drive gear positions in the auxiliary transmission gearing, R1 and R2 first and second reverse gear positions, F1, F2, F3, F4, F5, and F6 first through six forward gear positions.

The conventional speed ratio pattern shown in FIG. 1 is therefore composed of a lefthand pattern A and a righthand pattern B.

When a gear shift is to be effected while the automobile is running up a sloping road, the gear shift has be completed quickly, or it cannot be done as the speed of the automobile is rapidly reduced.

Such a condition will be described with reference to the speed ratio pattern of FIG. 1.

When the third speed ratio is to be reached while the automobile is running at the fourth-speed ratio F4, it is necessary to move a shift lever from the gear position F4 in the pattern B through the gear positions H and L to the gear position F3 in the pattern A. Thus, the path that the shift lever has to follow is quite complex, and it is difficult to follow that path in a short time. The difficulty arises out of the speed ratio pattern, which results from an arrangement shown in FIG. 2.

Figure 2:
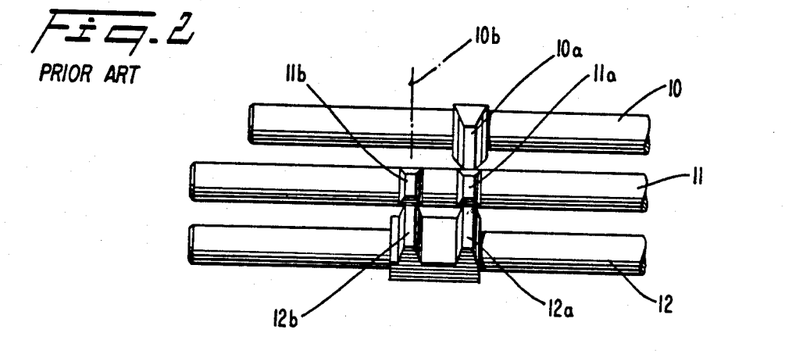
FIG. 2 is a front elevational view shift shafts in the conventional gear transmission mechanism having the shift pattern FIG. 1.

In FIG. 2, a shaft 10 actuates a shift fork in the auxiliary transmission gearing, and shafts 11, 12 actuate respective shift forks in the main transmission gearing. A shift lever engages teeth 10a, 11a, 11b, 12a, and 12b.

Operation of the arrangement of FIG. 2 is as follows:

When the shift lever engages the tooth 10a to position the shaft 10 as illustrated, the gear position H is reached, that is, the gears in the auxiliary transmission gearing is set to the high speed ratio. When the shift lever is slid from this position in a selecting direction into engagement with the tooth 11a and then shifted to move the shaft 11 in its axial direction, the gear position R2 or F2 is selected.

When the shift lever is moved from the tooth 11a to the tooth 12a and then shifted to move the shaft 12 in its axial direction, the gear position F4 or F6 is selected.

For a transfer from the pattern B to the pattern A, the shift lever is shifted back to the tooth 10a and shifted to move the tooth 10a to a position indicated by 10b, whereupon the gear position L (FIG. 1) is reached, that is, the auxiliary transmission gearing is set to the low speed ratio.

When the shaft 11 or 12 is to be actuated from this position, the shift lever is slid to the tooth 11b or 12b and then shifted to move the tooth 11b or 12b, thus actuating the shaft 11 or 12 in its axial direction. The actuation of the shaft 11 or 12 results in the selection of the gear position R1 or F1 or the gear position F3 or F5 in the pattern A of FIG. 1.

It will be understood therefore that the pattern shown in FIG. 1 arises out of the fact that the shaft 10 in the auxiliary transmission gearing is provided independently of the shaft 11 or 12 in the main transmission gearing.

SUMMARY OF THE INVENTION

It is an object of the present invention to provide a speed ratio pattern in which gear positions can easily be selected.

According to the present invention, there is provided a gear transmission mechanism including main transmission gearing and auxiliary transmission gearing directly coupled therewith, wherein the main transmission gearing transmits the movement of a shift lever in a shift direction through a shift mechanism and a fork head to a sleeve, the auxiliary transmission gearing being capable of selecting a high or low speed ratio in response to transmission of the movement of the shift lever to another sleeve when the shift lever is shifted from a neutral position in one shift direction or the other, the shift mechanism comprising an input member, a reversing mechanism, a reversing member, and a pair of shift heads, the input member coacting with the shift lever such that the movement of the shift lever in the shift direction results in the movement of the input member in a shift direction, the reversing mechanism being interposed between the input member and the reversing member for reversing the movement of the input member in the shift direction into movement in an opposite shift direction and for transmitting the reversed movement to the reversing member, one of the shift heads being shiftable from the neutral position into one shift position, selectively engageable with one of the input and reversing members which moves from the neutral position to the one shift position, and movable in the one shift direction, the other shift head being shiftable from the neutral position into an opposite shift position, selectively engageable with one of the input and reversing members which moves from the neutral position to the opposite shift position, and movable in the opposite shift direction, the fork head being interposed between the one and other shift heads and movable in a select direction in coaction with the shift lever moving in the select direction, the sleeve being engageable alternatively with the one or other shift head through the fork head in response to positioning of the fork head set in the select direction.

When the shift lever is in a first select position, the fork head is set in that select position, and the sleeve engages one of the shift heads through the fork head and is disengaged from the other shift head.

In the main transmission gearing under this condition, the movement of the shift lever is applied through the shift mechanism to said one shift head. When the shift lever is moved in either shift direction from the neutral position, therefore, said one shift head is shifted from the neutral position in one direction only.

Therefore, the sleeve engaging said one shift head through the fork head is moved from the neutral position in one shift direction only even when the shift lever is moved from the neutral position in any shift direction, the movement of the sleeve being effective in enabling the main transmission gearing to select one speed ratio only at all times.

In the auxiliary transmission gearing, the other sleeve remains in coaction with the shift lever, and hence the other sleeve is shifted from the neutral position in one shift direction when the shift lever is shifted from the neutral position to said one shift direction, whereupon the auxiliary transmission gearing selects a low speed ratio. When the shift lever is shifted from the neutral position in the other shift direction, the other sleeve is shifted from the neutral position in the other shift direction, whereupon the auxiliary transmission gearing selects a high speed ratio.

Thus, when the shift lever is set in the first select position, the main transmission gearing selects only one speed ratio, while the auxiliary transmission gearing selects one of the high and low speed ratios, when the shift lever is moved in a shift direction.

Since the main transmission gearing and the auxiliary transmission gearing are directly coupled, their operation as described above allows the overall gear transmission mechanism to selects one of first and second speed ratios simply by shifting the shift lever from the neutral position in one shift direction or the other.

For shifting the gear transmission to select third and fourth speed ratios, the shift lever is moved from the neutral position in a select direction normal to the shift directions toward a second select position.

When the shift lever is thus set in the second select position, the fork head is also set in the second select position, and the sleeve is brought into engagement with the other shift head through the fork and out of engagement with said one shift head.

In the main transmission gearing under this condition, the movement of the shift lever is applied through the shift mechanism to the other shift head. When the shift lever is moved in either shift direction from the neutral position, therefore, the other shift head is shifted from the neutral position in the other direction only.

Therefore, the sleeve engaging the other shift head through the fork head is moved from the neutral position in the other shift direction only even when the shift lever is moved from the neutral position in any shift direction, the movement of the sleeve being effective in enabling the main transmission gearing to select the other speed ratio only at all times.

In the auxiliary transmission gearing, the other sleeve remains in coaction with the shift lever as in the first select position, and hence the other sleeve is shifted from the neutral position in one shift direction when the shift lever is shifted from the neutral position to said one shift direction, whereupon the auxiliary transmission gearing selects a low speed ratio. When the shift lever is shifted from the neutral position in the other shift direction, the other sleeve is shifted from the neutral position in the other shift direction, whereupon the auxiliary transmission gearing selects a high speed ratio.

Thus, when the shift lever is set in the second select position, the main transmission gearing selects only the other speed ratio, while the auxiliary transmission gearing selects one of the high and low speed ratios, when the shift lever is moved in a shift direction.

Since the main transmission gearing and the auxiliary transmission gearing are directly coupled also in the second select position, the overall gear transmission mechanism selects one of third and fourth speed ratios simply by shifting the shift lever from the neutral position in one shift direction or the other when the shift lever is set in the second select position.

Therefore, simply by setting the shift lever in the first select position and shifting the shift lever in a shift direction, the first or second speed ratio can be obained. The third or fourth speed ratio can be obtained by moving the shift lever from the neutral position in the first select position in a select direction and shifting the shift lever in a shift direction in the second select position.

The movement of the shift lever in shift directions in the first select position, the movement of the shift lever from the first to the second select position in the neutral position, and the movement of the shift lever in shift directions in the second select position, jointly define an H-shaped shift pattern for the shift lever.

Therefore, the actuating mechanism according to the present invention provides an H-shaped shift pattern for the shift lever in ordinary gear transmission mechanisms in which main transmission gearing and auxiliary transmission gearing are directly coupled. Therefore, the shift lever can continuously be shifted up from the first select position to the second select position, or shifted down from the second select position to the first select position. The H-shaped shift pattern allows the driver to shift the shift lever easily in the above gear transmission mechanisms which are small in size, lightweight, and has a large number of speed ratios.

In case the actuating mechanism is used with the conventional lightweight gear transmission in which main transmission gearing and auxiliary transmission gearing are directly coupled, and also in case the gear transmission is mounted on an automobile, the automobile is made lightweight while allowing the driver to shift the shift lever in an H-shaped shift pattern.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 3:
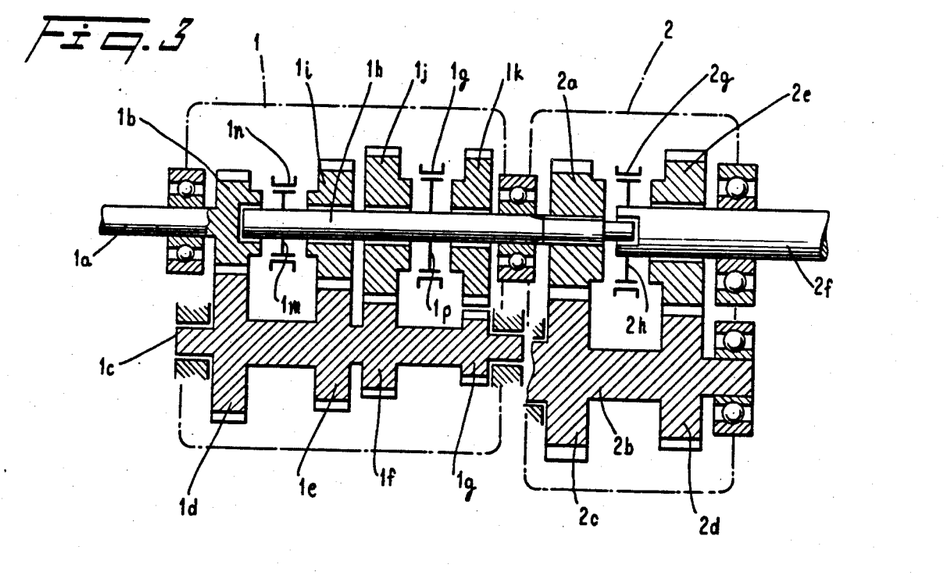
FIG. 3 is sectional side elevational view of gears in an ordinary gear transmission mechanism, to which the present invention is applied, having main transmission gearing and auxiliary transmission gearing which are directly coupled with each other.

As shown in FIG. 3, an input shaft 1a, an intermediate shaft 1h, and an output shaft 2f are rotatably supported by casings (not shown) of main transmission gearing 1 and auxiliary transmission gearing 2. The input shaft 1a, the intermediate shaft 1h, and the output shaft 2f are arranged in series with each other. Auxiliary shafts 1c, 2b extend parallel to the shafts 1a, 1h, and 2f.

A gear 1b is fixed to the input shaft 1a, gears 1d, 1e, 1f, 1g are fixed to the auxiliary shaft 1c, a gear 2a is fitted over the intermediate shaft 1h, and gears 2c, 2d are fixed to the auxiliary shaft 2b, the shafts and gears being corotatable.

Gears 1i, 1j, 1k are freely rotatably fitted over the intermediate shaft 1h, and a gear 2e is freely rotatably fitted over the output shaft 2f.

The gears 1b, 1d, the gears 1i, 1e, and the gears 1j, 1f are held in direct mesh with each other at all times, and the gears 1k, 1g are held in mesh with each other through an idling gear (not shown). The gears 2a, 2c and the gears 2d, 2e are held in direct mesh with each other at all times.

Hubs 1m, 1p are fitted over the intermediate shaft 1h for rotation therewith, and a hub 2h is fitted over the output shaft 2f for rotation therewith. Axially slidable sleeves 1n, 1q, 2g are splined to the hubs 1m, 1p, 2h, respectively.

Figure 4:
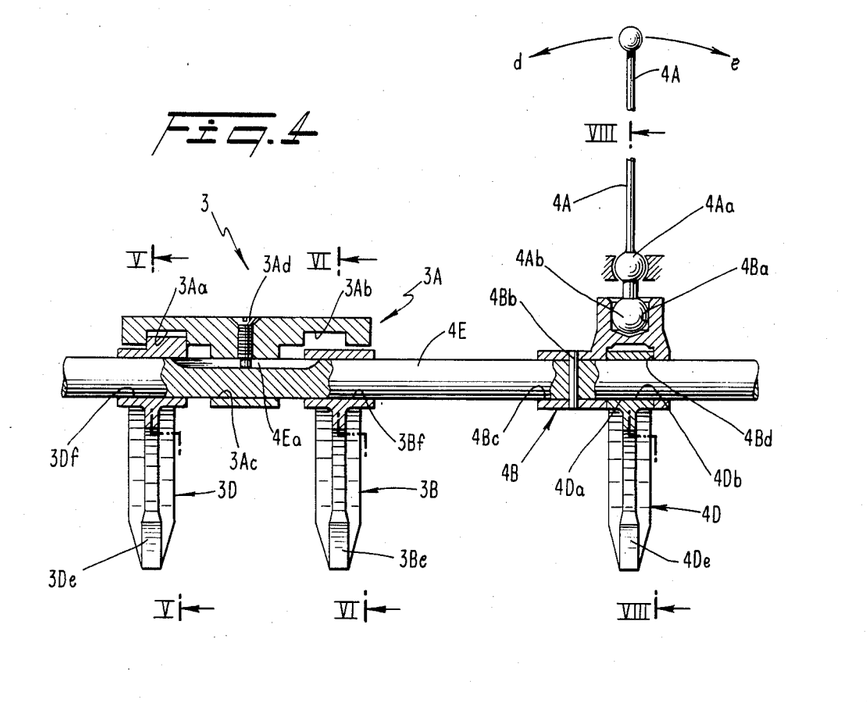
FIG. 4 is a sectional side elevational view of an actuating mechanism for use with the gear transmission mechanism for actuating sleeves therein.

The sleeves 1n, 1q, 2g have in outer peripheries thereof recesses (not shown) normal to their axes, and forks 3D, 3B, 4D shown in FIG. 4 are fitted respectively in the recesses.

FIG. 4 is illustrative of an actuating mechanism for the sleeves 1n, 1q, 2g.

As shown in FIG. 4, the sleeve actuating mechanism, generally denoted at 3, in the main transmission gearing 1 is composed of a fork head 3A, and a pair of forks 3B, 3D which are fitted over a shaft or input member 4E for axial sliding movement and circumferential rotational movement.

The fork head 3A has a hole 3Ac through which the shaft 4E extends for allowing the fork head 3A to be axially movable. A screw 3Ad threaded in the fork head 3A has a distal end projecting into a groove 4Ea defined in the shaft 4E.

Figure 5:
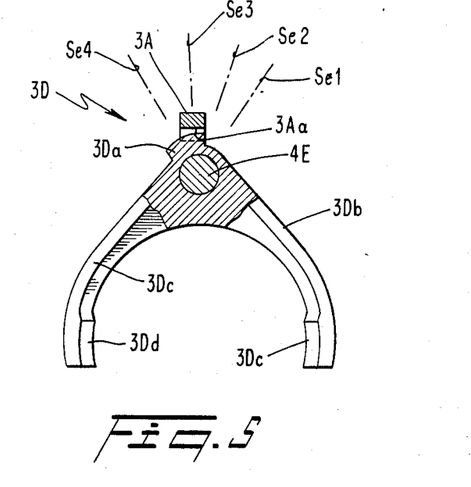
FIG. 5 is a cross-sectional view taken along line V—V of FIG. 4.
Figure 6:
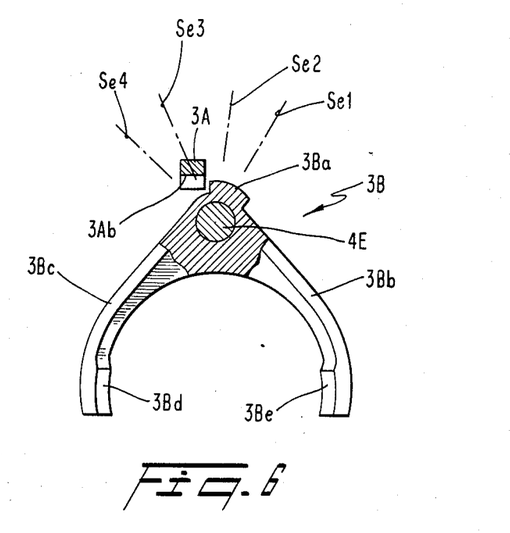
FIG. 6 is a cross-sectional view taken along line VI—VI of FIG. 4.

The fork head 3A is axially freely slidable with respect to the shaft 4E, but when the shaft 4E is turned about its own axis, the fork head 3A is also turned therewith through the screw 3Ad in the groove 4Ea selectively into four select positions Se1, Se2, Se3, Se4 as shown in FIGS. 5 and 6.

The fork head 3A and the forks 3D, 3B are positionally related as shown in FIGS. 5 and 6.

As shown in FIG. 5, the fork 3D has a projection 3Da and arms 3Db, 3Dc which have teeth 3De, 3Dd, respectively. As shown in FIG. 6, the fork 3B has a projection 3Ba and arms 3Bb, 3Bc which have teeth 3Be, 3Bd, respectively.

In FIGS. 5 and 6, the teeth 3Dd, 3De are fitted in the groove in the sleeve 1n, and the teeth 3Bd, 3Be are fitted in the groove in the sleeve 1q. Therefore, when the shaft 4e is turned to the angular select positions Se1 through Se4, the forks 3D, 3B will not rotate with the shaft 4E.

However, since the fork head 3A is angularly movable with the shaft 4E, the fork head 3A can be angularly moved to the select positions Se1 through Se4 upon turning movement of the shaft 4E.

The select positions Se1, Se2, Se3, Se4 are also indicative of angular positions to which the shaft 4E can be turned.

When the shaft 4E is in the select positions Se3, Se4, the projection 3Da of the fork 3D engages in a groove 3Aa in the fork head 3A, and when the shaft 4E is in the select positions Se1, Se2, the projection 3Da does not engage in the groove 3Aa. When the shaft 4E is in the select positions Se1, Se2, the projection 3Ba of the fork 3B engages in a groove 3Ab in the fork head 3A, and when the shaft 4E is in the select positions Se3, Se4, the projection 3Ba does not engage in the groove 3Ab.

Figure 7:
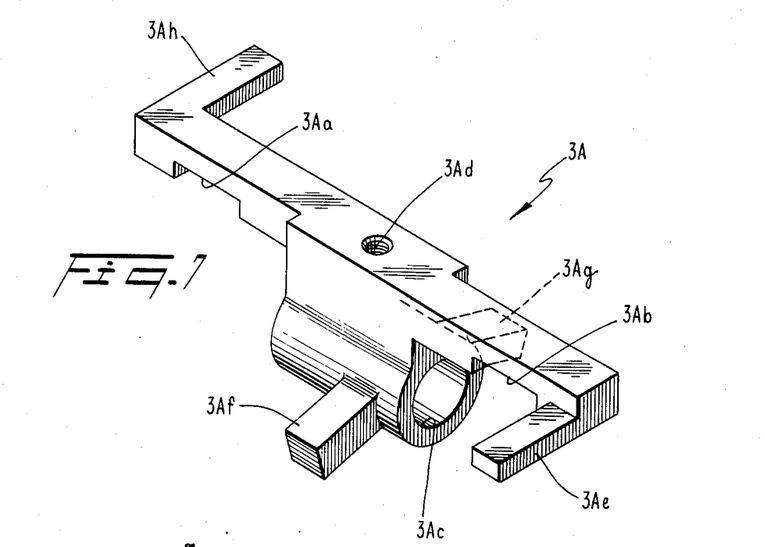
FIG. 7 is a perspective view of a fork head in the actuating mechanism of FIG. 4.

FIG. 7 shows the fork head 3A in perspective. Teeth 3Ae, 3Af, 3Ag, 3Ah are fixed to the fork head 3A.

In FIG. 4, a shift lever 4A is secured to a pivot 4Aa and has a distal end 4Ab fitted in a hole 4Ba in a shift lever housing 4B. The lever housing 4B has a groove 4Bd in which a boss 4Da of a fork 4D is gripped for axial sliding movement therewith. The shaft 4E is fitted in a hole 4Db in the fork 4D and a hole 4Bc in the shift lever housing 4B. A pin 4Bb is fitted in the shaft 4E and the shift lever housing 4B for enabling them to operate together. The shaft 4E and the fork 4D are relatively rotatable.

Figure 8:
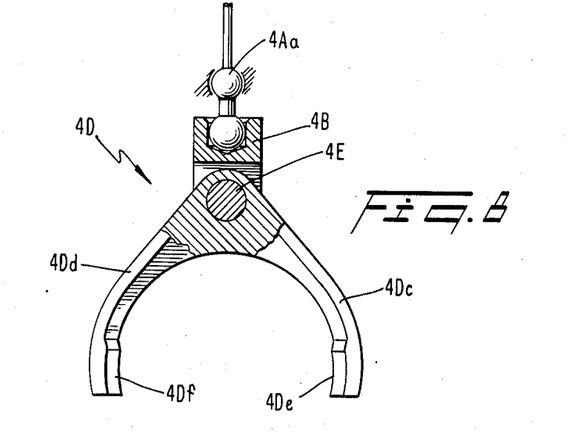
FIG. 8 is a cross-sectional view taken along line VIII—VIII of FIG. 4.

FIG. 8 shows the fork 4D in cross section. The fork 4D has arms 4Dc, 4Dd having respective teeth 4De, 4Df fited in the groove in the sleeve 2g of FIG. 3.

The shift lever 4A is swingable clockwise or counterclockwise about the pivot 4Aa in a plane of the sheet of FIG. 4, such clockwise or counterclockwise direction being referred to as a "shift direction". The shift lever 4A is also swingable clockwise or counterclockwise about the pivot 4Aa in a plane of the sheet of FIG. 8 into inlined positions in the select positions Se1, Se2, Se3, Se4, such clockwise or counterclockwise direction being referred to as a "select direction".

Figure 9:
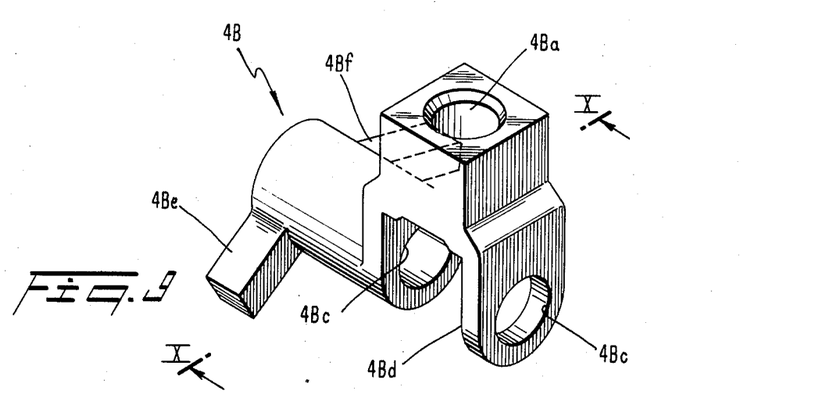
FIG. 9 is a perspective view of a shift lever housing in the actuating mechanism of FIG. 4.
Figure 10:
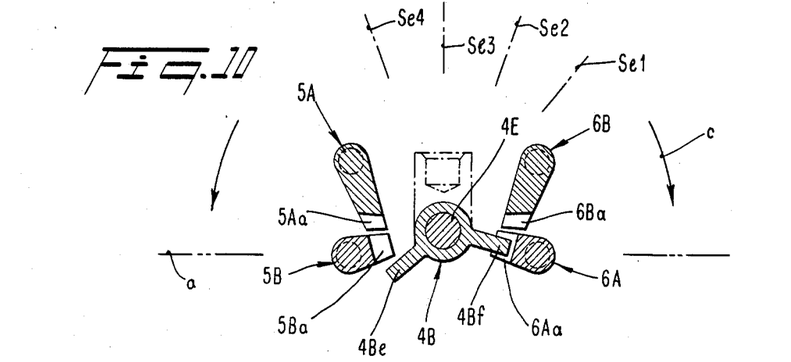
FIG. 10 is a cross-sectional view taken along line X—X of FIG. 9.

FIG. 9 illustrates the shift lever housing 4B in perspective. Teeth 4Be, 4Bf are secured to the shift lever housing 4B. As shown in FIG. 10, shafts 5A, 5B, 6A, 6B are disposed around the shaft 4E in parallel relation thereto.

Figure 11:
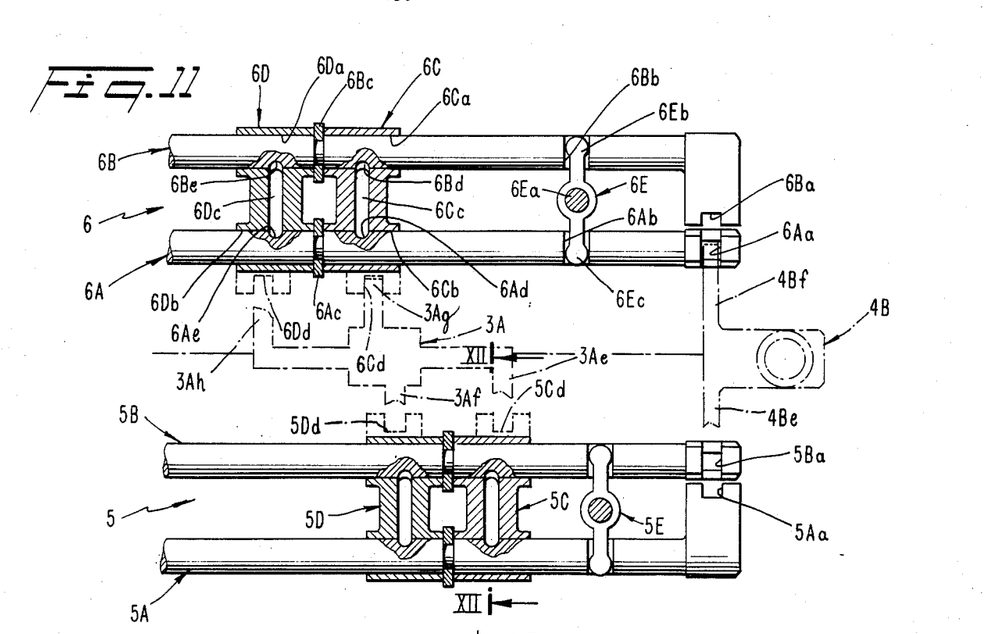
FIG. 11 is a view as seen in the direction of the arrow XI in FIG. 10, with shafts being shown as developed.

FIG. 11 shows the parts as seen in the direction of the arrow XI, the shafts 5A, 5B, 6A, 6B being shown as developed on a plane a in FIG. 10. More specifically, the shaft 5A is shown as developed in the direction of the arrow b about the shaft 5B, and the shaft 6B is shown as developed in the direction of the arrow c about the shaft 6A.

As illustrated in FIGS. 10 and 11, the shafts 5A, 5B, 6A, 6B have grooves 5Aa, 5Ba, 6Aa, 6Ba defined respectively therein.

In FIG. 10, the grooves 5Aa, 5Ba, 6Aa, 6Ba and the teeth 4Be, 4Bf are arranged to meet the following relationships:

(1) When the shift lever housing 4B is in the select position Se1, the tooth 4Be engages in the groove 5Aa;

(2) When the shift lever housing 4B is in the select position Se2, the tooth 4Be engages in the groove 5Ba;

(3) When the shift lever housing 4B is in the select position Se3, the tooth 4Bf engages in the groove 6Aa; and (2) When the shift lever housing 4B is in the select position Se4, the tooth 4Be engages in the groove 6Ba.

The following table 1 shows the parts engaged when the shift lever 4A of FIG. 4 is in the respective select positions:

TABLE 1

| Select position | Se1 | Se2 | Se3 | Se4 |
|---|---|---|---|---|
| Shafts engaging 4B | 5A | 5B | 6A | 6B |
| Shift heads engaging 3A | 5C | 5D | 6C | 6D |
| Fork engaging 3A | | 3B | | 3D |

As indicated in the uppermost row in the table 1, the shift lever housing 4B engages the shafts 5A, 5B, 6A, and 6B in the respective select positions Se1 through Se4.

In FIG. 11, the pair of shafts 5A, 5B constitutes a shift mechanism 5, and the pair of shafts 6A, 6B constitutes a shift mechanism 6, the shift mechanisms 5, 6 being arranged symmetrically with respect to the shafts 6A, 6B.

Therefore, only the shift mechanism 6 will be described with reference to FIG. 11.

In FIG. 11, an arm 6E is pivotably mounted on a pin 6Ea fixed to a transmission case (not shown), and has distal ends 6Ec, 6Eb engaging in grooves 6Ab, 6Bb defined in the shafts 6A, 6B, respectively.

The shaft 6A is axially slidably fitted in a hole 6Cb defined in a shift head 6C and a hole 6Db defined in a shift head 6D, and the shaft 6B is axially slidably fitted in a hole 6Ca defined in the shift head 6C and a hole 6Da defined in the shift head 6D.

The shafts 6A, 6B have grooves in which there are fitted retaining rings 6Ac, 6Bc, respectively, positioned between the shift heads 6C, 6D.

The shafts 6A, 6B also have grooves 6Ad, 6Ae, 6Bd, 6Be, and pins 6Cc, 6Dc are fitted respectively in holes in the shift heads 6C, 6D and have distal ends movable into the groove 6Ad or 6Ae in the shaft 6A or the groove 6Bd or 6Be in the shaft 6B.

Figure 12:
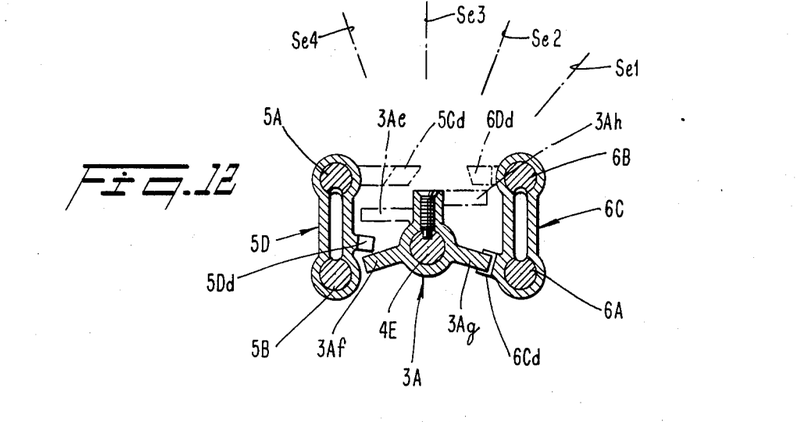
FIG. 12 is a cross-sectional view taken along line XII—XII of FIG. 11.

The fork head 3A and the shift heads 5C, 5D, 6C, 6D are related to each other as shown in FIG. 12.

In FIGS. 11 and 12, the shift heads 5C, 5D, 6C, 6D have grooves 5Cd, 5Dd, 6Cd, 6Dd, respectively, in which the teeth 3Ae, 3Af, 3Ag, 3Ah of the fork head 3A engage when the shaft 4E is in the respective select positions, in the following manner.

(1) When the shaft 4E is in the select position Se1, the tooth 3Ae engages in the groove 5Cd;

(2) When the shaft 4E is in the select position Se2, the tooth 3Af engages in the groove 5Dd;

(3) When the shaft 4E is in the select position Se3, the tooth 3Ag engages in the groove 6Cd; and (4) When the shaft 4E is in the select position Se4, the tooth 3Ah engages in the groove 6Dd.

Accordingly, when the shaft 4e is in the respective select positions Se1 through Se4, the fork head 3A engages the shift heads 5C, 5D, 6C, 6D, respectively.

Operation of the foregoing arrangement will be described hereinbelow:

The sleeves 1n, 1q, 2g in FIG. 3, the forks 3D, 3B, 4D in FIG. 4, and the shift mechanisms 5, 6 in FIG. 11 are all in neutral positions.

In the position of FIG. 3, therefore, power from an engine (not shown) is not transmitted through the input shaft 1a through the main transmission gearing 1 and the auxiliary transmission gearing 2 to the output shaft 2f.

Now, modes of operation of the main transmission gearing 1 in which only the sleeve 1q or 1n is actuated will be described.

When only the sleeve 1q is moved from the position of FIG. 3 in the main transmission gearing 1 to connect the gear 1k and the hub 1p, power is transmitted from the input shaft 1a through the gears 1b, 1d, the auxiliary shaft 1c, the gear 1g, the non-illustrated idling gear, the gear 1k, the sleeve 1q, and the hub 1p to the intermediate shaft 1h. Since the idling gear is interposed between the gears 1g, 1k, the intermediate shaft 1h is rotated in a direction opposite to that of rotation of the input shaft 1a.

When only the sleeve 1q is moved from the position of FIG. 3 to connect the gear 1j and the hub 1p, power is transmitted from the input shaft 1a through the gears 1b, 1d, the auxiliary shaft 1c, the gears 1f, 1j, the sleeve 1q, and the hub 1p to the intermediate shaft 1h. At this time, the intermediate shaft 1h is rotated at a low speed in a forward mode because of the illustrated gear ratio.

When only the sleeve 1n is moved from the position of FIG. 3 to connect the gear 1i and the hub 1m, power is transmitted from the input shaft 1a through the gears 1b, 1d, the auxiliary shaft 1c, the gears 1e, 1i, the sleeve 1n, and the hub 1m to the intermediate shaft 1h. At this time, the intermediate shaft 1h is rotated at a medium speed in a forward mode because of the illustrated gear ratio.

When only the sleeve 1n is moved from the position of FIG. 3 to connect the gear 1b and the hub 1m, power is transmitted from the input shaft 1a through the gears 1b, the sleeve 1n, and the hub 1m to the intermediate shaft 1h. At this time, the intermediate shaft 1h is rotated at a high speed as it is directly coupled to the input shaft 1a since power is transmitted from the input shaft 1a directly to the intermediate shaft 1h without the intermediary of the auxiliary shaft 1c.

Therefore, the main transmission gearing 1 is capable of selecting the following speed ratios:

(1) Reverse drive utilizing the gears 1k, 1g;

(2) Low-speed drive utilizing the gears 1j, 1f;

(3) Medium-speed drive utilizing the gears 1i, 1e; and (4) High-speed direct drive.

When the sleeve 2g is moved from the neutral position of FIG. 3 to connect the hub 2h and the gear 2e, power from the intermediate shaft 1h is transmitted through the gears 2a, 2c, the auxiliary shaft 2b, the gears 2d, 2e, the sleeve 2g, and the hub 2h to the output shaft 2f.

When the sleeve 2g is moved from the neutral position of FIG. 3 to connect the hub 2h and the gear 2a, power from the intermediate shaft 1h is transmitted through the gear 2a, the sleeve 2g, and the hub 2h to the output shaft 2f.

Thus, the auxiliary transmission gearing 2 is capable of selecting the following two speed ratios:

(1) Low-speed drive; and (2) High-speed direct drive.

The main transmission gearing 1 and the auxiliary transmission gearing 2 are capable of selecting speed ratios independently of each other. Since they are coupled by the intermediate shaft 1h, the total speed ratios selectable by the gear transmission mechanism composed of the main transmission gearing 1 and the auxiliary transmission gearing 2 is equal to the speed ratios of the main transmission gearing 1 multiplied by the two speed ratios of the auxiliary transmission gearing 2.

As a result, the following total range of speed ratios are available:

(1) First- and second-speed reverse drives utilizing the gears 1$k$, 1$g$;

(2) First- and second-speed forward drives utilizing the gears 1$j$, 1$f$;

(3) Third- and fourth-speed forward drives utilizing the gears 1$i$, 1$e$; and (4) Fifth- and sixth-speed forward drives utilizing the gear 1$b$ and the intermediate shaft 1$h$ which are directly coupled.

Operation of the control mechanism for actuating the sleeves 1$n$, 1$q$, 2$g$ in FIG. 3 will be described hereinbelow.

A mode of operation in which the gear position is changed from the neutral position to the third speed ratio will be described with reference to FIGS. 4 through 12.

For selecting the third speed ratio, the shift lever 4$a$ is moved in the select position from the neutral position to turn the shaft 4E to the select position Se3 (FIGS. 10 and 12).

With the shaft 4E in the select position Se3, the tooth 4B$f$ of the shift lever housing 4B engages the tooth 6A$a$ of the shaft 6A (FIG. 10), the tooth 3A$g$ of the fork head 3A engages in the groove 6C$d$ in the shift head 6C (FIG. 12), and the projection 3D$a$ of the fork 3D engages in the groove 3A$a$ (FIG. 5).

In this condition, as indicated in the select position Se3 in the table 1, (1) the shift lever housing 4B coacts with the shaft 6$a$; and (2) the fork head 3A coacts with the shift head 6C and the fork 3D.

When the shift lever 4A in tilted in the direction of the arrow d of FIG. 4 in the shfit direction while the parts are thus set, the distal end 4A$b$ of the shift lever 4B shifts the shift lever housing 4B to the right.

The shift lever housing 4B now causes the groove 4B$d$ to shift the fork 4D from the present neutral position to the right in FIG. 4, and at the same time causes the tooth 4B$f$ and the groove 6A$a$ (FIG. 11) to shift the shaft 6A from the present neutral position to the right.

As the fork 4D is shifted to the right in FIG. 4, the fork 4$d$ shifts the sleeve 2$g$ to the right in FIG. 3, whereupon the auxiliary transmission gearing 2 selects the low-speed drive.

When the shift lever housing 4B shifts the shaft 6A to the right, the shift mechanism 6 operates as follows:

When the shaft 6A is shifted rightward, the shift head 6C of the shift mechanism 6 shown in FIG. 11 is shifted to the right by the retaining ring 6A$c$ fitted over the shaft 6A. Since the arm 6E acting between the shafts 6A, 6B is turned counterclockwise about the pin 6E$a$, at this time, the shaft 6B is shifted to the left. The shift head 6D is shifted to the left by the retaining ring 6B$c$ fitted over the shaft 6B At this time, the pin 6C$d$ fitted in the hole in the shift head 6C is positioned in the groove 6A$d$ in the shaft 6A, and the pin 6D$c$ fitted in the hole in the shift head 6D is positioned in the groove 6B$e$ in the shaft 6B.

Figure 13:
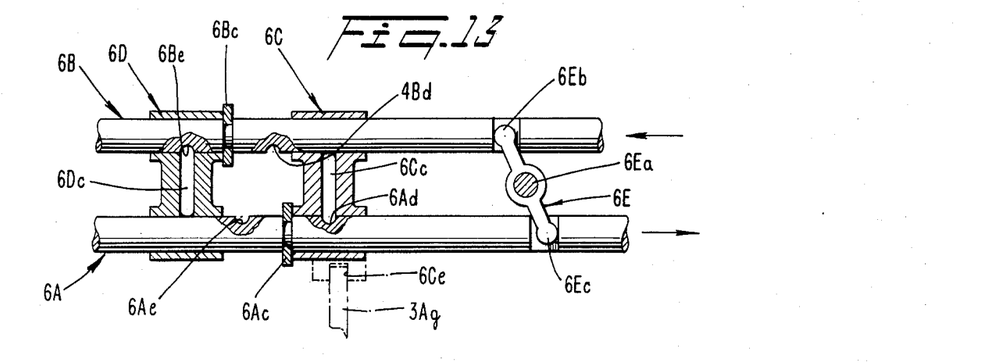
FIGS. 13 and 14 are views illustrative of operation of a shift mechanism in FIG. 11.

The shifting movement of the shift head 6C to the right in FIG. 13 shifts the fork head 3$a$ to the right since the tooth 3A$g$ fits in the groove 6C$e$. The fork 3D is also shifted to the right in FIG. 4 since the projection 3D$a$ of the fork 3D engages in the groove 3A$a$ in the fork head 3A.

Upon the rightward shifting movement of the fork 3D causes the sleeve 1$n$ engaging the fork 3D to be shifted from the present neutral position to the right (FIG. 3).

Therefore, power from the engine is transmitted through the main transmission gearing 1 thus set, that is, from the input shaft 1$a$, the gears 1$b$, 1$d$, the auxiliary shaft 1$c$, the gear 1$e$, 1$i$, the sleeve 1$n$, and the hub 1$m$ to the intermediate shaft 1$h$ while the auxiliary transmission gearing 2 is in the low-speed drive gear position. As a result, the gear transmission as a whole selects the third speed ratio.

In selecting the third speed ratio, the shift head 6D is shifted to the left by the retaining ring 6B$c$ fitted over the shaft 6B. Because the shift head 6D is disengaged from the fork head 3A, the shift head 6D is shifted in an idling condition.

The gears can be returned from the third speed ratio to the neutral position as follows:

When the shift lever 4A is shifted from the third speed ratio back to the position of FIG. 4, the shift lever housing 4B is returned to shift the shaft 6A from the position of FIG. 13 to the left. Since the pin 6C$c$ is in the groove 6A$d$ in the shaft 6A and engages the shaft 6A at this time, the shift head 6C and the shaft 6A are shifted to the left in FIG. 13 to cause the fork head 3A and the fork 3D to return the sleeve 1$n$ to the neutral position of FIG. 3.

At this time, the shaft 6B, the pin 6D$c$, the shift head 6D are likewise shifted to the right in FIG. 13 through the arm 6E until they are brought back to the neutral position of FIG. 11.

Selection of the fork speed ratio will now be described.

The shaft 4E may remain in the select position Se3 used in the third speed ratio for shifting the gears from the neutral position of FIG. 11 to the fourth speed ratio.

As a consequence, the shift lever housing 4B and the shaft 6A are related in the same manner as that of the third speed ratio as shown in the select position Se3 in the table 1.

When the shift lever 4A is shifted in the direction of the arrow e of FIG. 4 while in the select position Se3, the shift lever housing 4B is shifted to the left, and the shaft 6A coacting therewith is also shifted to the left. The shift mechanism 6 is thus shifted from the position of FIG. 11 to the position of FIG. 14.

Figure 14:
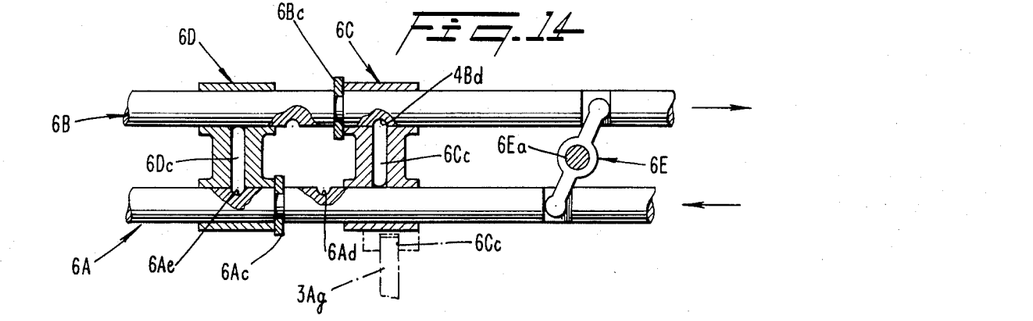

As shown in FIG. 14, the leftward shifting movement of the shaft 6A causes the retaining ring 6C$a$ fitted over the shaft 6A to shift the shift head 6A to the left. Since the shift head 6D does not coact with the fork head 3A at this time, the shift head 6D is shifted only in an idling condition.

The arm 6E is then turned clockwise about the pin 6E$a$ by the leftward shifting movement of the shaft 6A, so that the shaft 6B is shifted to the right. As a result, the retaining ring 6B$c$ fitted over the shaft 6B shifts the shift head 6C to the right.

At this time, the pin 6C$c$ is pushed by the shaft 6A into the groove 6B$d$, and the pin 6D$c$ is pushed by the shaft 6B into the groove 6A$e$, so that the position of FIG. 14 is achieved.

Therefore, the shift head 6C is shifted to the right in the same manner as that for the third speed ratio even with the shaft 6A shifted to the left. In the main transmission gearing 1, the sleeve 1$n$ engages the gear 1$i$ (FIG. 3) as described above with respect to the selection of the third speed ratio.

In the auxiliary transmission gearing 2, however, the fork 4D is shifted to the left in response to the leftward shifting movement of the shift lever housing 4B, and the sleeve 2g is shifted to the left by the fork 4D to cause the gear 2a and the hub 2h to be directly connected.

Figure 15:
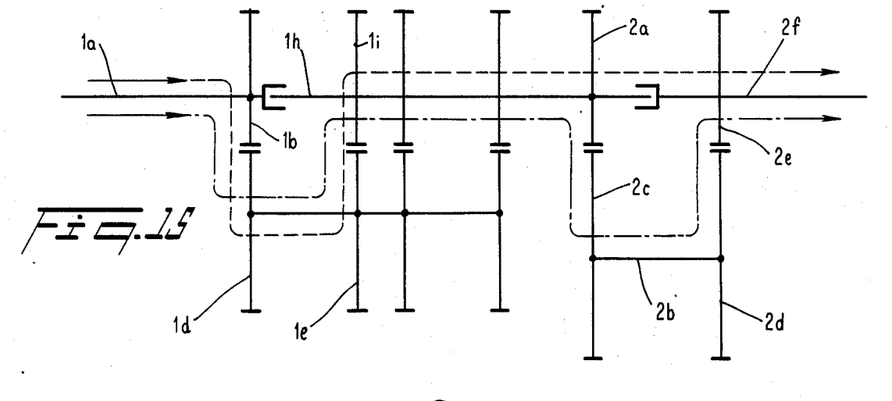
FIG. 15 is a skelton diagram of a gear train in FIG. 3.

Engine power is now transmitted in the direction of the dotted line in FIG. 15, in which the fouth speed ratio is selected.

FIG. 15 is illustrative of the gear arrangement of FIG. 3 in a skeleton pattern. The flow of engine power as indicated by the solid line is achieved by the third speed ratio.

For returning to the neutral position of FIG. 11 from the fourth speed ratio, the shift lever 4A should be moved back to the position of FIG. 4 in the same manner as that for the return from the third speed ratio to the neutral position.

The above modes of operation of selecting the third and fourth speed ratios will hereinafter be summarized.

While the main transmission gearing 1 selects one fixed speed ratio, the auxiliary transmission gearing 2 can select two speed ratios by shifting the sleeve 2g from the neutral position of FIG. 3 to the right and the left. If the fixed speed ratio in the main transmission gearing 1 is selected by the gears 1i, 1e, then the two speed ratios selected by the auxiliary transmission gearing 2 become the third and fourth speed ratios in the overall gear transmission mechanism.

Therefore, when the driver shifts the shift lever 4A in one direction or the other in the select position Se3, the sleeve 2g is shifted in one direction or the other in the auxiliary transmission gearing 2. In the main transmission gearing 1, however, the sleeve 1n has to be shifted in one direction only.

In meeting the above requirement, the third and fourth speed ratios can be achieved by shifting the shift lever 4A in the direction of the arrow d (FGI. 4) and the direction of the arrow e, as described above.

This is because, (1) when the shift lever 4A is shifted in one shift direction, the movement of the shift lever 4A is transmitted through the shift lever housing 4B and the fork 4D directly to the sleeve 2g, and (2) when the shift lever 4A is shifted in the opposite shift direction, the movement thereof is applied to the shift mechanism 6 in FIG. 11 which causes its output member or the shift head 6C to move the fork head 3A from the neutral position to one side only.

In the operation of the shift mechanism 6 at the third and fourth speed ratios, a "first control mechanism" composed of the shafts 6A, 6B, the arm 6E, and the shift head 6C in the shift mechanism 6 is effectively utilized, and the shift head 6D is in the idling condition as is understood from the foregoing description.

The first control mechanism in the shift mechanism 6 is therefore employed in selecting the third and fourth speed ratios.

The shift mechanism 6 comprises the first control mechanism and a "second control mechanism" composed of the shafts 6A, 6B, the arm 6E, and the shift head 6D. As described below, the second control mechanism is employed for selecting the fifth and sixth speed ratios.

While the second control mechanism is in use, the first control mecahnism is in an idling condition.

Modes of operation for selecting the fifth and sixth speed ratios will be described.

In selecting the fifth and sixth speed ratios, the sleeve 1n in the main transmission gearing 1 is required to be shifted toward the gear 1b only when the sleeve 2g is shifted in one direction or the other in the auxiliary transmission gearing 2 in FIG. 3. To reach such a position, the shift lever 4A is moved to bring the shaft 4E into the select position Se4.

As indicated in the table 1, when the shaft 4E is set to the select position Se4, the fork head 3A remains in engagement wtih the fork 3D as in the case of the third and fourth speed ratios, while being brought out of engagement with the shift head 6C and into engagement with the shift head 6D.

As a consequence, the second control mechanism in the shift mechanism 6 is used in the select position Se4, with the shift head 6C idling.

As described with reference to FIGS. 13 and 14, the shift mechanism 6 operates in the select position Se4 such that the shift lever 6d is always shifted to the left no manner which direction the shift lever housing 6B is shifted in from the neutral position (FIG. 4).

In the select position Se4, therefore, when the shift lever 4A is shifted from the neutral position in the direction d or e in FIG. 4, the shift lever housing 4B shifts the sleeve 2g to the right or the left, while the shift head 6D shifts the sleeve 1n to the left only.

Now, the input shaft 1a and the intermediate shaft 1h remain directly coupled in main transmission gearing 1, while the auxiliary transmission gearing 2 is capable of selecting lower and higher speed ratios, with the result that the gear transmission as a whole can select the fifth or six speed ratio.

The first reverse gear position R1, the second reverse gear position R2, and the first and second forward gear positions can be achieved by employing the shift mechanism 5 in FIG. 11 and the sleeve 1q in FIG. 3.

Shifting the sleeve 1q selectively toward the gear 1k or the gear 1j is accomplished by the same pattern as that in which the sleeve 1n is actuated in selecting the third through sixth speed ratios.

Therefore, the shift mechanism 5 of FIG. 11 for shifting the sleeve 1q is of substantially the same arrangement as that of the shift mechanism 6, except that the fork 3A is held in engagement with the fork 3B at all times as shown in the table 1. Operation in the select positions Se1, Se2 will not be given as it is the same as that in the select positions Se3, Se4, as described above.

Figure 16:
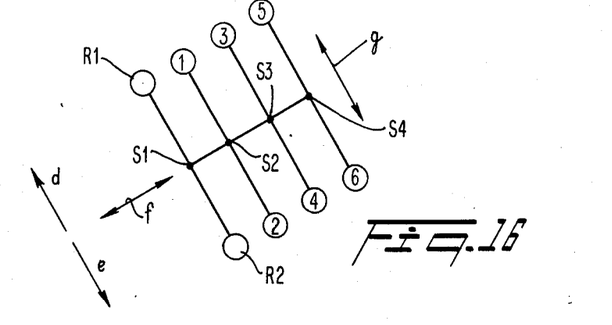
FIG. 16 is a diagram showing a shift pattern for a shift lever in FIG. 4.

Speed ratios obtained by selecting the select positions and the shift directions of the shaft 4E are set forth in the table 2, the pattern of speed ratios being a single H-shaped pattern as shown in FIG. 16. The table 2 shows gear positions obtained by selecting the select positions and the shift directions of the shaft 4E in FIGS. 5 and 6:

TABLE 2

| Shift direction | Select position | | | |
|---|---|---|---|---|
|  | Se1 | Se2 | Se3 | Se4 |
| Direction d in FIG. 16 | R1 | 1st | 3rd | 5th |
| Direction e in FIG. 16 | R2 | 2nd | 4th | 6th |

The speed ratios can be achieved by moving the shift lever 4A in the select direction f (FIG. 16) to select one of positions S1 through S4, and shifting the shift lever 4A in the shift direction g at the selected position.

With the shift lever 4A set to the position S1, S2, S3, or S4, the shaft 4E is set to the select position Se1, Se2, Se3, or Se4. Designated in FIG. 16 at R1, R2 are gear positions for first and second reverse speed ratios, and 1 through 6 are gear positions for the first through sixth speed ratios.

In FIG. 11, the arms 5E, 6E are effective in reversing the shifting movement of one shaft 5A or 6A in one direction and transmitting the reversed movement to the other shaft 5B or 6B. The arms 5E, 6E may be replaced with a rack and pinion for reversing the shaft movement. More specifically, a pinion may be fitted over the pin 6Ea, a rack may be formed on each of the shaft 6A, 6B, and the pinion and racks may be held in mesh with each other.

Thus, the shift mechanisms 5, 6 are required that there be a movement reversing mechanism 6E between the shaft 6A or 6B serving an input member coupled to the shift lever housing 4B and the shaft 6B or 6A serving as a reversing member, so that the input and reversing members will be shifted in mutually opposite directions.

With the arrangement of the present invention, the main transmission gearing 1 can select only one fixed gear train by shifting the shift lever 4A in the direction d or e in a fixed select position as shown in FIG. 4, while the auxiliary transmission gearing 2 can select one of two gear trains for high and low speed ratios. By moving the shift lever 4A in select directions, one of fixed select positions can be selected, thus providing a single H-shaped pattern of speed ratios.

Where the actuating mechanism of the invention is incorporated in a gear transmission mechanism including auxiliary transmission gearing capable of reducing the number of total gears used, the gear transmission mechanism is lightweight and small size, and at the same time has a single H-shaped speed ratio pattern as shown in FIG. 16, rather than conventional two combined patterns as shown in FIG. 1. The single speed ratio pattern allows the gears to be successively shifted down to a lower speed ratio or up to a higher speed ratio.

Therefore, the gear shifting operation can be effected smoothly. The smooth gear shifting operation is advantageous especially for heavy trucks which would require the driver to be skillful in shifting gears.

Where more speed ratios are to be added to the main transmission gearing 1, shift mechanisms 5, 6 of the same design may only be added. Therefore, the transmission can be designed easily, the types of parts used can be simplified, and the cost of manufacture can be reduced.

Although a certain preferred embodiment has been shown and described, it should be understood that many changes and modifications may be made therein without departing from the scope of the appended claim.

What is claimed is:

1. A gear transmission mechanism including main transmission gearing and auxiliary transmission gearing directly coupled therewith, wherein said main transmission gearing transmits the movement of a shift lever in a shift direction through a shift mechanism and a fork head to a sleeve, said auxiliary transmission gearing being capable of selecting a high or low speed ratio in response to transmission of the movement of the shift lever to another sleeve when said shift lever is shifted from a neutral position in one shift direction or the other, said shift mechanism comprising an input member, a reversing mechanism, a reversing member, and a pair of shift heads, said input member coacting with said shift lever such that the movement of said shift lever in said shift direction results in the movement of said input member in a shift direction, said reversing mechanism being interposed between said input member and said reversing member for reversing the movement of said input member in said shift direction into movement in an opposite shift direction and for transmitting the reversed movement to said reversing member, one of said shift heads being shiftable from the neutral position into one shift position, selectively engageable with one of said input and reversing members which moves from said neutral position to said one shift position, and movable in said one shift direction, the other shift head being shiftable from the neutral position into an opposite shift position, selectively engageable with one of said input and reversing members which moves from said neutral position to said opposite shift position, and movable in said opposite shift direction, said fork head being interposed between said one and other shift heads and movable in a select direction in coaction with said shift lever moving in said select direction, said sleeve being engageable alternatively with said one or other shift head through said fork head in response to positioning of said fork head in said select direction.

2. The transmission of claim 1, whrein said fork head is provided with a plurality of teeth engageable with a pair of shift forks so as to control engagement and disengagement of the main transmission gearing.

3. the transmission of claim 2, wherein a first one of the pair of shift forks is movable between engagement and disengagement of reverse and low speed gearing 4. The transmission of claim 2, wherein a second one of the pair of shift forks is movable between engagement and disengagement of medium and high speed gearing.

5. The transmission of claim 2, wherein said pairs of shift heads is connectable to said fork head so as to determine a speed range operation of said main transmission gearing.

6. The transmission of claim 1, wherein said reversing member comprises a pair of shift shafts.

7. the transmission of claim 6, wherein said reversing mechanism is connected to said pair of shift shafts.

* * * * *